United States Patent [19]

Fought

[11] Patent Number: 4,700,802
[45] Date of Patent: Oct. 20, 1987

[54] MATERIAL HANDLING VEHICLE HAVING REMOTE TRANSMISSION CONTROLLER

[75] Inventor: Gerald E. Fought, Sugarcreek, Ohio

[73] Assignee: The Gradall Company, New Philadelphia, Ohio

[21] Appl. No.: 807,573

[22] Filed: Dec. 11, 1985

[51] Int. Cl.[4] .......................... B60K 26/00; B62D 1/22
[52] U.S. Cl. ..................................................... 180/324
[58] Field of Search ....................... 180/321, 324, 69.6

[56] References Cited

U.S. PATENT DOCUMENTS

| 2,761,569 | 9/1956 | Iserman | 180/324 |
|---|---|---|---|
| 2,959,260 | 11/1960 | Johnson et al. | 180/324 |
| 3,059,716 | 10/1962 | Iserman et al. | 180/321 |
| 3,599,814 | 8/1971 | Brownfield | 414/718 |
| 3,840,132 | 10/1974 | Howells, Jr. et al. | 414/694 |
| 4,189,021 | 2/1980 | Scheuerpflug et al. | 180/69.6 |
| 4,262,783 | 4/1981 | Scarrott et al. | 192/0.09 |
| 4,425,620 | 1/1984 | Batcheller et al. | 364/424.1 |

OTHER PUBLICATIONS

"The Apple II Plus/IIe Troubleshooting & Repair Guide" by Robert C. Brenner, c. 1984, Howard W. Sams & Co., pp. 134–137.

*Primary Examiner*—John J. Love
*Assistant Examiner*—Kenneth R. Rice
*Attorney, Agent, or Firm*—Kirkpatrick & Lockhart

[57] ABSTRACT

A remote controller for the transmission of a material handling vehicle having a lower chassis on which is mounted a truck cab, an engine and the transmission and which pivotally supports an upper structure including an upper cab and a material handling implement is provided. A three-way rocker switch is mounted on a joystick in the upper cab and is connected via a single control wire through a single slip ring to the main shift controller. The rocker switch is normally biased with a reference voltage which, when the switch is actuated to its other positions is either increased or grounded. First and second comparators in the main shift controller monitor the voltage in the control wire and cause a counter to increase or decrease the number stored in its memory on the basis of increases or decreases in the control wire voltage. The main shift controller then outputs a signal to the shift solenoids of the transmission based on the number stored in the counter.

8 Claims, 3 Drawing Figures

MATERIAL HANDLING VEHICLE HAVING REMOTE TRANSMISSION CONTROLLER

BACKGROUND OF THE INVENTION

Reference is made to the following U.S. patent applications which were filed on the same date as the instant application was filed, are owned by the assignee of the present application, and which relate to inventions which are employed on the same commercial apparatus on which this invention is employed: Ser. No. 807,553; Ser. No. 807,616; and Ser. No. 807,617.

FIELD OF THE INVENTION

The present invention relates to a material handling vehicle having a lower chassis which includes an engine and transmission and an upper structure pivotally attached thereto and, more particularly, to a material handling vehicle having a means for controlling the transmission which means is mounted in the upper structure.

DESCRIPTION OF THE PRIOR ART

Frequently, a heavy duty material handling vehicle includes a lower or truck chassis which is provided with supporting wheels or the like, certain of which may be driven by means of an engine connected to a transmission. Pivotally mounted on the lower chassis is an upper structure which supports a material handling mechanism such as a crane or a hydraulically extensible boom provided with, for example, a bucket. The truck chassis is capable of being driven over a road or highway under the control of an operator in a cab mounted on the lower chassis. An upper structure operator's cab is provided on the upper structure to move with the material handling mechanism mounted thereon. During operation at a construction site, an operator in the upper structure cab can control movement of the material handling mechanism and also, preferably, of the truck chassis.

In order to provide for the movement of the entire material handling vehicle under the control of an operator in the upper cab two systems have been employed each having a commom goal. According to one such system, an engine and transmission were provided on the truck chassis for controlling over-the-road travel with a separate engine being provided on the upper structure. The upper engine was capable of driving a hydraulic pump which pumped fluid to a hydraulic motor which, in addition to powering the material handler functions, was able to drive the transmission on the lower truck chassis and, hence, the drive wheels of the vehicle. Alternatively, and most preferably, it has recently been discovered that a single engine and transmission on the lower truck chassis may be provided to generate motive power for highway travel and also to power remote travel and the various hydraulic functions of the material handling implement. In such a vehicle, under the control of an operator in the upper cab, the engine pumps hydraulic fluid directly to a hydraulic pump which in turn transmits the pressure of the hydraulic fluid via a hydraulic motor into a rotational force which itself may be input into the transmission of the material handling vehicle to drive its drive wheels. As such, it is clear that in either event, to provide for the remote travel operation of a material handling vehicle, it is necessary to control the operative gear range of its transmission.

Accordingly, in connection with a material handling vehicle there must be provided a means for controlling the gear range in which the transmission is to operate at a given point in time. One prior art method of controlling the transmission did not involve the upper operator's cab in any way. In such a vehicle, before an operator left the lower truck cab to enter the upper structure cab he would select the intended gear range from the lower cab. The operator would then stop the engine and climb into the upper cab and direct the movement of the vehicle. If he desired to select another gear range, an operator was forced to stop the material handling vehicle and its engine from the upper cab, climb down therefrom and into the lower truck cab, select an alternative gear range, exit the lower truck cab and reenter the upper structure cab and proceed to restart the engine and initiate vehicle travel using the controls in the upper cab. Clearly, such a system was grossly inefficient and substantially reduced the productivity of the material handling vehicle.

The subject invention is directed toward a method of and means for controlling the shifting of a transmission on the lower truck chassis of a material handling vehicle by an operator in the upper structure cab thereof which overcomes, among others, the above-discussed problems and which provides an effective, efficient, inexpensive and readily utilized means for controlling the shifting of a transmission from the upper cab which avoids the necessity of operator movement from the upper to the lower cab to change gear ranges and dramatically increases the productivity of such a vehicle.

SUMMARY OF THE INVENTION

In accordance with the present invention there is provided an improved material handling vehicle having a lower structure which includes an engine, a power shift transmission having solenoids to control gear ranges and a truck cab and which supports a relatively movable upper structure having a material handling implement and an upper operator's cab mounted thereon. In the upper structure cab there is provided a joystick for the remote control of the movement of the material handling vehicle. The joystick controls a hydraulic motor powered by a pump driven by the engine. The hydraulic motor, via a power input, drives the transmission on the lower truck chassis. A single double-acting rocker switch is provided on the joystick to control the selection of the gear range of the transmission of the vehicle.

A single wire communicates between the rocker switch and the transmission with the rocker switch being normally biased to a reference voltage. Upon activation of the switch in one direction the wire is biased to a higher voltage. Conversely, when the transmission control switch is actuated in the opposite direction it is grounded thereby providing a momentary lower voltage in the control wire. The control wire is connected via a slip ring to the main shift controller. Provided in the main shift controller are two comparators. One comparator senses whether the voltage in the main control wire exceeds the reference voltage. If so, it causes a counter which stores a numeral in memory to advance one count, which counter in turn generates a signal corresponding to each numeral in memory which controls the output from the main shift controller to the respective solenoids of the power shift transmission.

Conversely, the other comparator senses whether the voltage in the control wire is less than the reference voltage, and, if so, causes the counter to decrease by one count which causes the counter to generate a different output signal to activate another solenoid on the transmission by means of the main shift controller.

Accordingly, the present invention provides solutions to the aforementioned problems relating to the remote control of the transmission of a material handling vehicle. As the present invention provides a single switch which, via a single wire, remotely controls the transmission gear range, the shortcomings of prior art material handling vehicle control systems are overcome. In addition, the overall cost of the vehicle as well as the operating costs thereof are reduced while the vehicle's productivity is enhanced by eliminating the necessity of operator movement between cabs to control the transmission.

These and other details, objects and advantages of the invention will become apparent as the following description of the present preferred embodiment thereof proceeds.

BRIEF DESCRIPTION OF THE DRAWINGS

For a better understanding of the invention reference may be had to the preferred embodiment exemplary of the invention shown in the accompanying drawings in which.

DETAILED DESCRIPTION OF THE PREFERRED EMBODIMENTS

Figure 1:
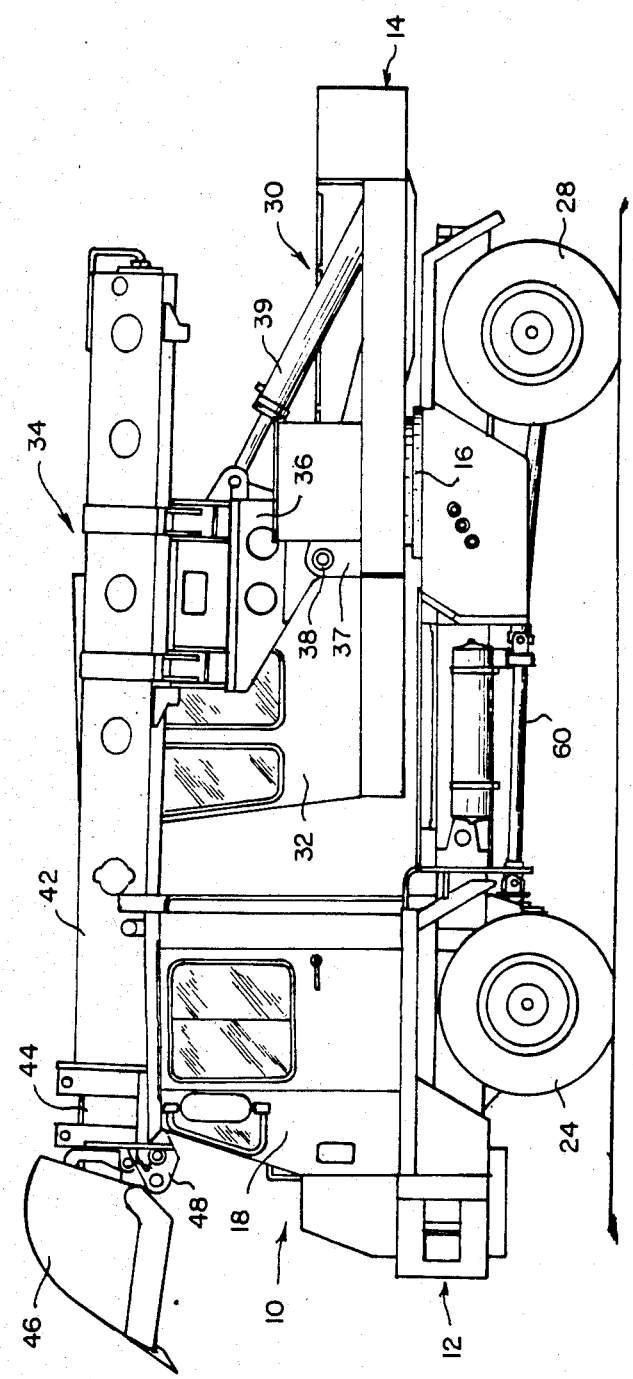
FIG. 1 is a left elevation view of a truck mounted extensible boom hydraulic excavator.
Figure 2:
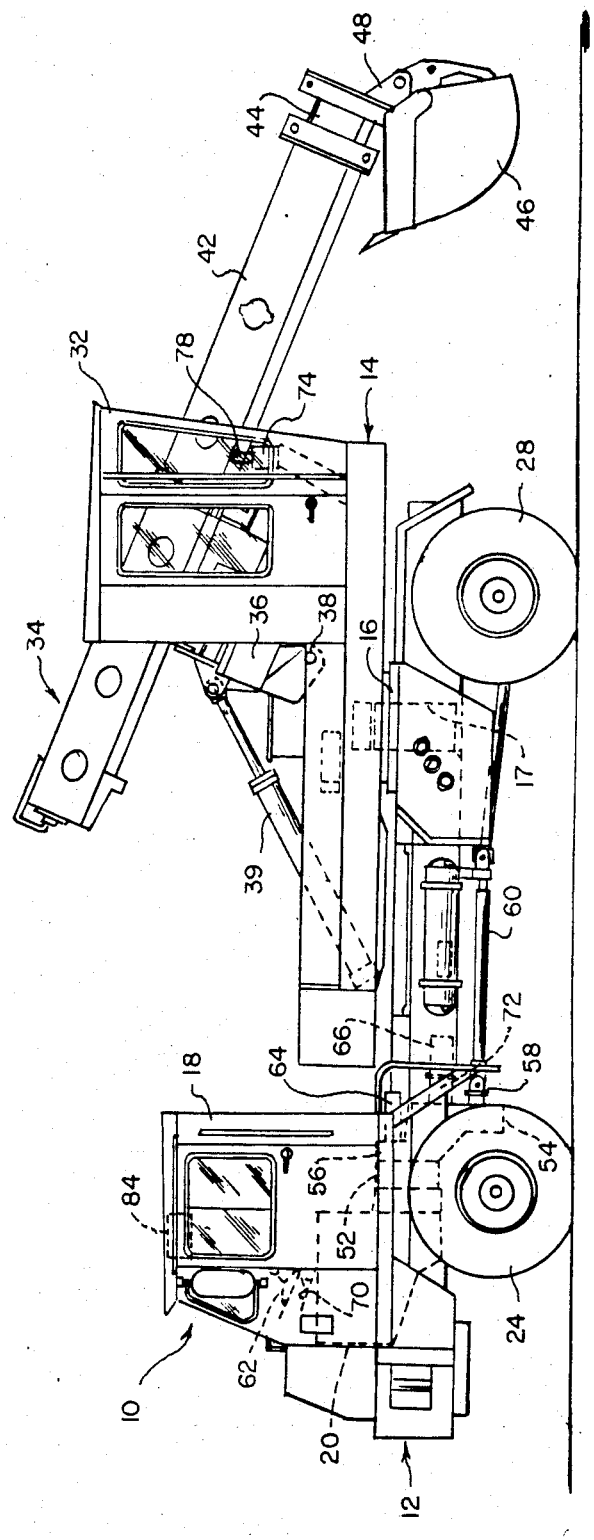
FIG. 2 is a left elevation view of the apparatus shown in FIG. 1 with the upper structure rotated 180° and the boom manipulated; and, FIG. 3 is a schematic view of the components of the transmission control apparatus disclosed herein.
Figure 3:
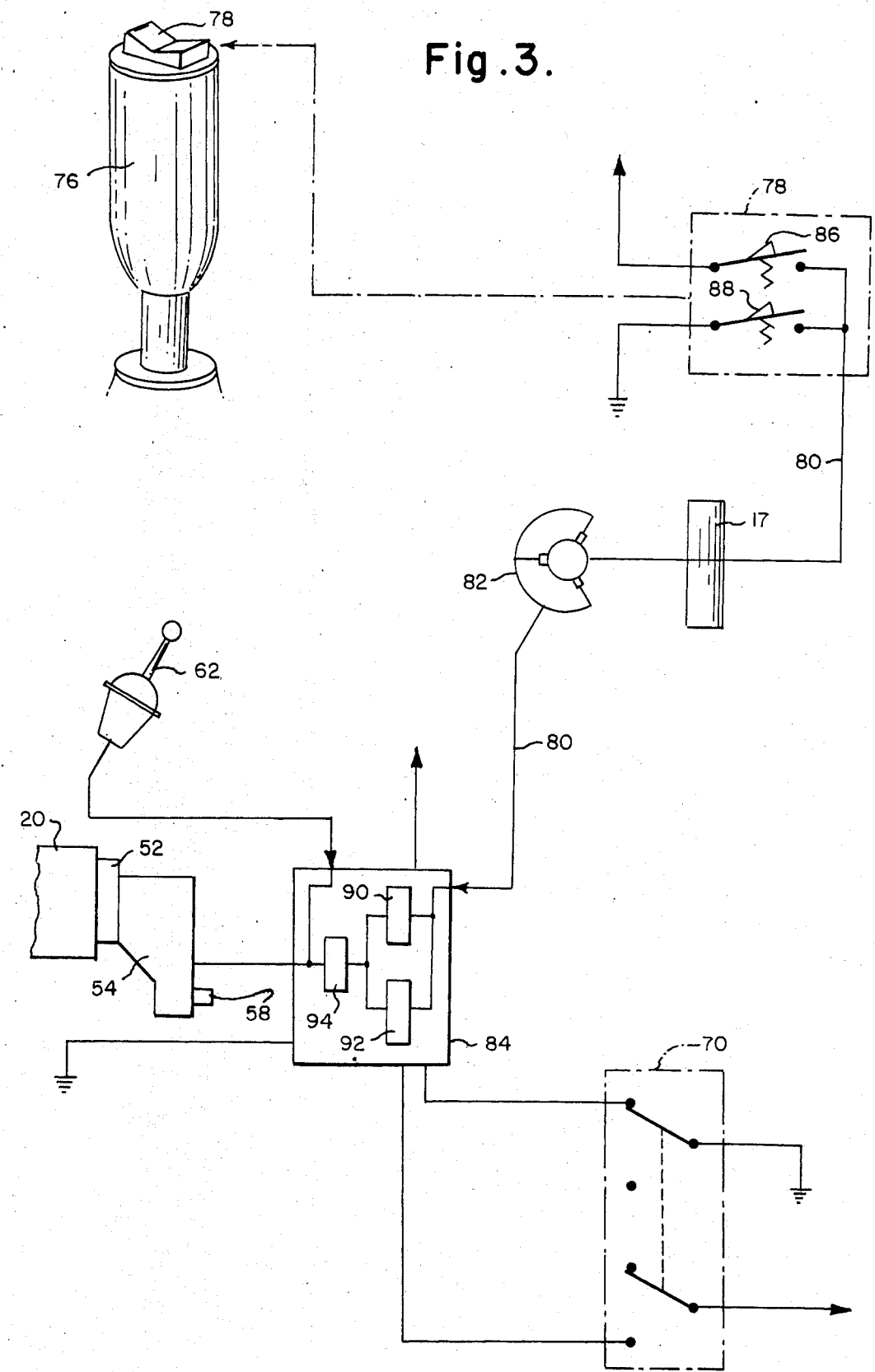

Referring now to the drawings wherein the showings are for purposes of illustrating the present preferred embodiment of the invention only and not for purposes of limiting same, the figures show a mobile material handling apparatus 10 which, for purposes of the present DETAILED DESCRIPTION OF THE PREFERRED EMBODIMENTS, will be described as an extensible boom hydraulic excavating apparatus, also called an excavator.

More particularly and with reference to FIG. 1 there is shown an excavator 10 which includes a lower truck chassis 12 and an upper structure 14 rotatably supported thereon by means of a swing bearing 16 acting in connection with a center pin 17. Lower chassis 12 is provided with a truck cab 18 mounted beside an engine 20. A front axle (not depicted) supports the end of lower chassis 12 nearest truck cab 18 on front wheels 24 while a rear axle (not shown) supports the rear of lower chassis 12 on rear wheels 28.

The upper structure 14 includes an upper platform, generally indicated as 30 on one end of which is mounted an upper structure remote operator's cab 32. In addition, an extensible boom, generally 34, is mounted to a boom support cradle 36 which is pivotally attached to a support member 37 of upper platform 30 by means of pins 38 and which allows boom 34 to be vertically pivotable with respect to upper platform 30. Such vertical pivoting of boom 34 is accomplished by means of hydraulic tilt cylinder 39 attached between boom cradle 36 and the end of upper platform 30 remote from upper operator cab 32.

Boom 34 includes a first section 42 which is mounted to boom cradle 36 and a second section 44 which is provided to be supportable by and hydraulically retractable within first section 42. A material handling implement 46, such as a bucket, is preferably movably attached to the free end of second boom section 44 by means of a pivotable support 48.

With respect to the general operation of excavator 10, truck cab 18 is occupied by an operator during over the road or distant movement of the excavator 10 to a selected job site. Operator cab 32 is occupied by the operator to control the movement of excavator 10 around a given job site and when it is desired to manipulate the boom 34, a work implement such as a bucket 46 or to rotate upper structure 14 relative to lower chassis 12 in a manner known in the art. The movement of lower chassis 12 can be provided by either a two wheel drive system in which only rear wheels 28 are preferably driven or a four wheel drive system in which all wheels 24 and 28 are driven. General operating characteristics and functional capabilities of a material handling vehicle 10 are similar to those disclosed in U.S. Pat. Nos. 3,587,886; 3,599,814 and 3,666,125.

Operatively connected to the engine 20 mounted on lower chassis 12 is a torque converter 52 which transmits rotational power from the engine 20 either directly to a transmission 54 or to a power take off 56. Transmission 54 preferably comprises an electric solenoid controlled power shift transmission such as that manufactured by Funk, Inc. and designated as Model 2000. Each gear range of transmission 54 is controlled by the activation of a combination of the electric solenoids mounted thereon. As such, if transmission 54 has six forward speeds and three reverse speeds, six solenoids must be mounted on transmission 54. Transmission 54 also is preferably provided with a rearward facing power output 58 which drives rear wheels 28 by means of drive shaft 60. During normal travel of excavator 10 over the road, an operator in truck cab 18 controls the selected gear range of transmission 54 by means of a shift lever 62 located in truck cab 18.

The power take off 56 is selectively engageable by means of a first jaw clutch (not shown) to a hydraulic pump 64. The hydraulic pump 64 is in fluid communication with a hydraulic motor 66 via a travel valve (not depicted) which directs hydraulic fluid either to hydraulic motor 66 or to the other areas of excavator 10. A travel/remote selector 70 is also disposed within truck cab 18 to control whether, in the travel mode, the engine 20 drives transmission 54 or whether, in remote mode, the hydraulic pump 64 is coupled to the engine 20 for providing pressurized fluid for powering the manipulation of implement 46 or remote travel of vehicle 10. When the transmission 54 is placed in neutral, the engine 20 stopped and the travel/remote selector 70 is actuated to select remote operation, the first jaw clutch is caused to engage power takeoff 56 thereby enabling engine 20 to turn hydraulic pump 64 which provides hydraulic fluid to rotate the hydraulic motor 66. The rotational force of hydraulic motor 66 is input to transmission 54 by means of a jaw clutch 72 which becomes coupled with an auxilliary power input shaft (not shown). This auxilliary input shaft is connected to the operative portions of transmission 54 which rotatably power the three lower range forward gears thereof. The rotation of the selected gear of the three is then output to transmission output 58 to drive shaft 60. If it is desired to move vehicle 10 in reverse, the hydraulic motor 66 is caused to rotate in a reverse direction while driving the same set of gears of transmission 54.

The control for the selection of the desired transmission 54 gear range during remote operation of excavator 10 is found in upper cab 32. A mounting 74 includes a joystick 76 which has mounted on the top thereof a three-way rocker switch 78. Rocker switch 78 is normally spring biased into a median neutral position. An operator may readily displace rocker switch 78 from its neutral position to a first position further from the operator or to a second position closer on rocker switch 78 to the operator. The rocker switch 78 is connected by means of a single wire 80 to a slip ring 82 located in center pin 17. Slip ring 82 is connected by the continuation of wire 80 to a main shift controller 84 which may be mounted in the inner roof of truck cab 18. Shift controller 84 preferably consists of an electronic device energized by travel/remote selector 70 which determines whether shift controller 84 accepts transmission 54 control signals from truck cab shift selector 62 or upper cab rocker switch 78. In either event, the shift controller 84 generates output signals which are fed to the various solenoids mounted on transmission 54 to control the selection of the several gears included therein. Shift controller 84 receives its shift commands either from truck cab shift selector 62 or rocker switch 78 mounted on joystick 76 in upper cab 32.

Wire 80 is normally biased by shift controller 84 to a reference voltage such as plus three volts. The contact 86 within rocker switch 78 corresponding to its first position is biased to a higher voltage than the reference voltage, such as to plus twelve volts. In addition, the contact 88 within rocker switch 78 corresponding to the second position thereof is normally connected to ground in order that there is a zero voltage on such contact 88. It will be appreciated, therefore, that when rocker switch 78 is actuated to the first position the voltage in wire 80 is temporarily modified from plus three to plus twelve volts. Alternatively, when rocker switch 78 is actuated to its second position the voltage in wire 80 temporarily is modified from three volts to zero volts.

The output from wire 80 is connected to a first, increasing voltage comparator 90 and a second, decreasing voltage comparator 92 which are provided within shift controller 84. First comparator 90 is capable of generating an output signal if it detects a voltage in excess of the reference voltage while second comparator 92 is capable of generating a separate output signal if it detects a voltage in wire 80 which is less than the reference voltage. The respective outputs from comparators 90 and 92 are fed into a counter means 94 which generates a discrete output signal based on a decimal numeral then stored in its memory. The various output signals of counter 94 are connected to electronic means for controlling the activation of the solenoids mounted on transmission 54 on the basis of the output signals from counter 94.

As stated above, the decimal numeral stored in the memory of counter 94 is sequentially modified upon receipt of signals from comparators 90 and 92. Hence, if the counter 94 has the number "one" in memory and comparator 90 sends a signal thereto to increase that number, the counter 94 will then increase that number by one count and store the newly instructed number "two" in its memory. Counter 94 will then cause a different output signal to be generated from shift controller 84 thereby changing which solenoids on transmission 54 are actuated which, in turn, causes the shifting of the gear range thereof. Similarly, if the counter 94 has the number "two" in its memory and comparator 92 sends a signal to decrease that number, the counter will then decrease the stored number by one and store the newly instructed number "one" in its memory and cause an output signal to be generated therefrom which thereby will cause the solenoids on transmission 54 corresponding to such new signal to be energized which, in turn, causes the selection of an alternative gear range thereof. When the rocker switch 78 is in a median position, the reference voltage of three volts is being monitored by comparators 90 and 92, which, due to the absence of a voltage greater than or less than three volts, do not cause any different output signals to be generated therefrom. The absence of any different output signals thereby causes transmission 54 to remain in its then present gear range.

Accordingly, an operator in upper cab 32 may control the gear range of transmission 54 by simply actuating rocker switch 78 into one position or another. It is notable that such shifting may be accomplished even during remote travel and under throttle due to the power shifting capabilities of transmission 54.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for remotely controlling the solenoid controlled transmission of a material handling vehicle which includes a lower chassis having an engine and said transmission, which lower chassis supports an upper structure having a material handling implement and upper cab, from said upper cab, comprising:
    a. a means for impressing a source reference potential in a single control wire which passes from said upper cab to said lower chassis;
    b. a switch mounted in said upper cab, said switch having a first contact which is selectively engageable with a source of potential which is higher than said reference potential and a second contact which is selectively engageable with ground, the open sides of said first and said second contacts being connected to said control wire;
    c. means for determining whether the potential in said control wire is greater than, less than or equal to said reference potential; and,
    d. means responsive to said determination for producing a transmission control signal based on such determination effective to control the solenoids of said transmission.

2. Apparatus of claim in which the means for determining the magnitude of the potential in said control wire relative to said reference potential comprises:
    a. a first comparator connected to said control wire and capable of ascertaining whether and generating a first signal if the potential in said control wire is greater than said reference potential; and,
    b. a second comparator connected to said control wire and capable of ascertaining whether and generating a second signal if the potential in said control wire is less than said reference potential.

3. Apparatus of claim 2 in which said means responsive to said determination comprises a counter capable of storing a numerical value in a memory and of generating an output signal for controlling said solenoids of said transmission based on said numerical value, said counter also being capable on receipt of said first signal of sequentially increasing said numerical value and upon receipt of said second signal of sequentially decreasing said numerical value, said counter being further capable of generating an output control signal based on said numerical value stored in said memory.

4. Apparatus of claim 3 in which said first and second comparators and said counter are mounted in said lower chassis and said control wire passes from said upper cab to said lower chassis by means of a slip ring mounted adjacent said center pin.

5. Apparatus of claim 4 in which said switch is mounted on a joystick disposed within said upper cab, said joystick being capable of remotely controlling the travel of said vehicle.

6. Method of controlling a transmission having solenoids effective to select the operating gear range of said transmission comprising:
   a. imposing a reference potential on a control wire;
   b. providing a control switch effective, when actuated in one manner, to cause a potential higher than said reference potential to be imposed on said control wire and when operated in another manner to cause said control wire to be grounded;
   c. monitoring the potential imposed on said control wire to determine whether the potential in said control wire is higher or lower than or equal to said reference potential and generating an intermediate signal based on such determination;
   d. storing a numeral in the memory of a counting means;
   e. modifying the numeral stored on said memory of said counting means on the basis of said intermediate signal; and,
   f. generating a control signal corresponding to the numeral stored in the memory os said counting means and providing said control signal to said solenoids of said transmission.

7. Method of claim 6 in which the step of monitoring the potential imposed on said control wire comprises:
   a. passing the potential imposed on said control wire to a first comparator which is capable of ascertaining whether and generating a first intermediate signal if the potential imposed on said control wire is greater than said reference potential; and,
   b. passing the potential imposed on said control wire to a second comparator which is capable of ascertaining whether and generating a second intermediate signal if the potential imposed on said control wire is less than said reference potential.

8. Method of claim 7 in which, upon receipt of said first intermediate signal, said counter increases the numeral stored in its memory by one count and in which, upon receipt of said second intermediate signal, said counter decreases the numeral stored in its memory by one count.

* * * * *

UNITED STATES PATENT AND TRADEMARK OFFICE
CERTIFICATE OF CORRECTION

PATENT NO. : 4,700,802
DATED : October 20, 1987
INVENTOR(S) : Gerald E. Fought

It is certified that error appears in the above-identified patent and that said Letters Patent is hereby corrected as shown below:

Col. 6, line 57, after "claim" insert --1--.

Signed and Sealed this

Twenty-second Day of March, 1988

*Attest:*

DONALD J. QUIGG

*Attesting Officer*    Commissioner of Patents and Trademarks